(12) United States Patent
Grealish-Rust et al.

(10) Patent No.: US 12,359,924 B2
(45) Date of Patent: **\*Jul. 15, 2025**

(54) SYSTEMS AND METHODS FOR GENERATING SCENIC ROUTES

(71) Applicant: QUANATA, LLC, San Francisco, CA (US)

(72) Inventors: Patricia Grealish-Rust, Dighton, MA (US); Theobolt N. Leung, San Francisco, CA (US); Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,767

(22) Filed: Apr. 29, 2024

(65) Prior Publication Data
US 2024/0280367 A1 Aug. 22, 2024

Related U.S. Application Data

(63) Continuation of application No. 17/854,367, filed on Jun. 30, 2022, now Pat. No. 11,971,262, which is a
(Continued)

(51) Int. Cl.
*G01C 21/34* (2006.01)
*G01C 21/36* (2006.01)
*G06Q 50/00* (2012.01)

(52) U.S. Cl.
CPC ....... *G01C 21/343* (2013.01); *G01C 21/3461* (2013.01); *G01C 21/3614* (2013.01);
(Continued)

(58) Field of Classification Search
None
See application file for complete search history.

(56) References Cited

U.S. PATENT DOCUMENTS 7,130,743 B2  10/2006  Kudo et al.
8,532,927 B2   9/2013  Joshi et al.
(Continued)

FOREIGN PATENT DOCUMENTS

CN    107133277    9/2017

OTHER PUBLICATIONS

Yan-tao Zheng, et al. "GPSView: A scenic driving route planner" Feb. 2013, ACM Transactions on Multimedia Computing, Communications and Applications, vol. 9, No. 1 pp. 3:1-3:18 (Year: 2013).*
(Continued)

*Primary Examiner* — Hongye Liang
(74) *Attorney, Agent, or Firm* — BRYAN CAVE LEIGHTON PAISNER LLP

(57) ABSTRACT

A computer-implemented method of generating a scenic route including: receiving, by one or more processors, a user request from a user for directions from an origin location to a destination location; identifying, by the one or more processors, one or more route segments of one or more routes between the origin location and the destination location based on at least telemetry data and point of interest (POI) data; determining, by the one or more processors, one or more respective scenic views proximate to the one or more respective scenic points; receiving, by the one or more processors, a selection of at least one of the one or more respective scenic views; and transmitting, by the one or more processors, navigation directions to the user for at least one route of the one or more routes. Other embodiments are described.

20 Claims, 3 Drawing Sheets

Related U.S. Application Data continuation of application No. 16/795,145, filed on Feb. 19, 2020, now Pat. No. 11,402,223.

(52) U.S. Cl.
CPC ..... *G01C 21/3617* (2013.01); *G01C 21/3679* (2013.01); *G06Q 50/01* (2013.01)

(56) References Cited

U.S. PATENT DOCUMENTS

| | | |
|---|---|---|
| 9,074,901 B1 | 7/2015 | Subramanian et al. |
| 9,677,886 B2 | 6/2017 | Didjusto et al. |
| 9,709,413 B2 | 7/2017 | Caceres et al. |
| 2003/0009281 A1 | 1/2003 | Whitham |
| 2018/0281858 A1* | 10/2018 | Griffith ................ G05D 1/0246 |
| 2021/0123749 A1 | 4/2021 | Kreig et al. |

OTHER PUBLICATIONS

Yan-Tao Zheng and et al. "GPSView: A Scenic Driving Route Planner", Feb. 2013, ACM Transaction on Multimedia Computing, Communications and Applications, vol. 9 (Year: 2013) 2013.

Chen et al., "Scenic Planner: Planning scenic travel routes leveraging heterogeneous user-generated digital footprints", Frontiers of Computer Science, 11(1), 2017, pp. 61-74. 2017.

Zheng et al., "GPS View: A scenic driving route planner. ACM Transactions on Multimedia Computing, Communications and Applications", 9(1), Feb. 2013, pp. 3:1-3:18. 2013.

* cited by examiner

SYSTEMS AND METHODS FOR GENERATING SCENIC ROUTES

CROSS-REFERENCE TO RELATED APPLICATIONS

The present application is a Continuation Application of U.S. patent application Ser. No. 17/854,367, filed on Jun. 30, 2022, to be issued as 11,971,262, which is a continuation of U.S. application Ser. No. 16/795,145, filed on Feb. 19, 2020, issued as U.S. Pat. No. 11,402,223. U.S. patents application Ser. Nos. 17/854,367 and 16/795,145, and U.S. Pat. No. 11,402,223 are herewith incorporated by reference in their entirety.

FIELD OF THE DISCLOSURE

The present disclosure generally relates to vehicle safety and, more particularly, to generating scenic routes and safe parking locations associated with scenic points along the scenic routes.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

When a driver is rushed, he or she may choose to take the fastest route from an origin location to a destination location. However, the fastest route from the origin location to the destination location may be an unappealing or boring route (e.g., a route consisting mainly of highways). Accordingly, when a driver is not in a hurry, he or she may wish to avoid unappealing or boring routes in favor of more scenic or more interesting routes.

SUMMARY

A computer-implemented method of generating a scenic route and a safe parking location proximate a scenic point is provided. The method comprises: receiving, by one or more processors, a user request for navigation directions from an origin location to a destination location, wherein the user request includes an indication of a user preference for a scenic route; identifying, by one or more processors, based at least in part upon map data, a plurality of routes between the origin location and the destination location; analyzing, by one or more processors, historical telemetry data and POI data associated with one or more route segments associated with each route of the plurality of routes between the origin location and the destination location to identify one or more scenic indications associated with one or more scenic points along each route segment of the one or more route segments; wherein the historical telemetry data includes one or more stopping indications corresponding to one or more locations along each route segment of the one or more route segments where one or more vehicles has historically stopped for a time period greater than a predetermined threshold time period, wherein the POI data includes one or more POI indications corresponding to one or more points of interest along each route segment of the one or more route segments, and wherein scenic points include stopping points that are greater than a threshold distance from any POI; selecting, by one or more processors, one of the plurality of routes between the origin location and the destination location based at least in part upon the scenic points associated with the route segments of the route; analyzing, by one or more processors, a plurality of parking locations proximate scenic points to determine a safe parking location from the plurality of parking locations for each of the scenic points, wherein the safe parking locations have a lower risk of damage to a vehicle; and presenting, by one or more processors, navigation directions for the selected one route from the origin location to the destination location to the user, including navigation directions to the safe parking locations proximate the scenic points.

In another aspect, a computer system for generating a scenic route is provided. The computer system comprises one or more processors; and a non-transitory program memory communicatively coupled to the one or more processors and storing executable instructions. The instructions, when executed by the one or more processors, cause the computer system to: receive a user request for navigation directions from an origin location to a destination location, wherein the user request includes an indication of a user preference for a scenic route; identify, based at least in part upon map data, a plurality of routes between the origin location and the destination location; analyze historical telemetry data and POI data associated with one or more route segments associated with each route of the plurality of routes between the origin location and the destination location to identify one or more scenic indications associated with one or more scenic points along each route segment of the one or more route segments; wherein the historical telemetry data includes one or more stopping indications corresponding to one or more locations along each route segment of the one or more route segments where one or more vehicles has historically stopped for a time period greater than a predetermined threshold time period, wherein the POI data includes one or more POI indications corresponding to one or more points of interest along each route segment of the one or more route segments, and wherein scenic points include stopping points that are greater than a threshold distance from any POI; select one of the plurality of routes between the origin location and the destination location based at least in part upon the scenic points associated with the route segments of the route; analyze a plurality of parking locations proximate scenic points to determine a safe parking location from the plurality of parking locations for each of the scenic points, wherein the safe parking locations have a lower risk of damage to a vehicle; and present navigation directions for the selected one route from the origin location to the destination location to the user, including navigation directions to the safe parking locations proximate the scenic points.

In still another aspect, a tangible, non-transitory computer-readable medium storing executable instructions for generating a scenic route is provided. The instructions, when executed by at least one processor of a computer system, cause the computer system to: receive a user request for navigation directions from an origin location to a destination location, wherein the user request includes an indication of a user preference for a scenic route; identify, based at least in part upon map data, a plurality of routes between the origin location and the destination location; analyze historical telemetry data and POI data associated with one or more route segments associated with each route of the plurality of routes between the origin location and the destination location to identify one or more scenic indications associated with one or more scenic points along each route segment of the one or more route segments; wherein the historical telemetry data includes one or more stopping indications corresponding to one or more locations along each route segment of the one or more route segments where one or more vehicles has historically stopped for a time period greater than a predetermined threshold time period, wherein the POI data includes one or more POI indications corresponding to one or more points of interest along each route segment of the one or more route segments, and wherein scenic points include stopping points that are greater than a threshold distance from any POI; select one of the plurality of routes between the origin location and the destination location based at least in part upon the scenic points associated with the route segments of the route; analyze a plurality of parking locations proximate scenic points to determine a safe parking location from the plurality of parking locations for each of the scenic points, wherein the safe parking locations have a lower risk of damage to a vehicle; and present navigation directions for the selected one route from origin location to the destination location to the user, including navigation directions to the safe parking locations proximate the scenic points.

A number of embodiments can include a computer-implemented method of generating a scenic route, the computer-implemented method. The method can include receiving, by one or more processors, a user request from a user for directions from an origin location to a destination location. The method also can include identifying, by the one or more processors, one or more route segments of one or more routes between the origin location and the destination location based on at least telemetry data and point of interest (POI) data to identify one or more respective scenic points along each route segment of the one or more route segments. The method additionally can include determining, by the one or more processors, one or more respective scenic views proximate to the one or more respective scenic points along each route segment of the one or more route segments of the one or more routes. The method further can include receiving, by the one or more processors, a selection of at least one of the one or more respective scenic views based at least in part upon one or more types of the one or more respective scenic views. The method also can include transmitting, by the one or more processors, navigation directions to the user for at least one route of the one or more routes from the origin location to the destination location comprising the at least one of the one or more respective scenic views, as selected.

Several embodiments can include system comprising one or more processors and one or more non-transitory computer-readable media storing computing instructions that, when executed on the one or more processors, cause the one or more processors to perform certain acts. The acts can include receiving, by one or more processors, a user request from a user for directions from an origin location to a destination location. The acts also can include identifying, by the one or more processors, one or more route segments of one or more routes between the origin location and the destination location based on at least telemetry data and point of interest (POI) data to identify one or more respective scenic points along each route segment of the one or more route segments. The acts additionally can include determining, by the one or more processors, one or more respective scenic views proximate to the one or more respective scenic points along each route segment of the one or more route segments of the one or more routes. The acts further can include receiving, by the one or more processors, a selection of at least one of the one or more respective scenic views based at least in part upon one or more types of the one or more respective scenic views. The acts also can include transmitting, by the one or more processors, navigation directions to the user for at least one route of the one or more routes from the origin location to the destination location comprising the at least one of the one or more respective scenic views, as selected.

Some embodiments can include one or more non-transitory computer-readable media storing computing instructions that, when executed by one or more processors, cause the one or more processors to perform certain acts. The acts can include receiving, by one or more processors, a user request from a user for directions from an origin location to a destination location. The acts also can include identifying, by the one or more processors, one or more route segments of one or more routes between the origin location and the destination location based on at least telemetry data and point of interest (POI) data to identify one or more respective scenic points along each route segment of the one or more route segments. The acts additionally can include determining, by the one or more processors, one or more respective scenic views proximate to the one or more respective scenic points along each route segment of the one or more route segments of the one or more routes. The acts further can include receiving, by the one or more processors, a selection of at least one of the one or more respective scenic views based at least in part upon one or more types of the one or more respective scenic views. The acts also can include transmitting, by the one or more processors, navigation directions to the user for at least one route of the one or more routes from the origin location to the destination location comprising the at least one of the one or more respective scenic views, as selected.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

As discussed above, when a driver is rushed, he or she may choose to take the fastest route from an origin location to a destination location. However, the fastest route from the origin location to the destination location may be an unappealing or boring route (e.g., a route consisting mainly of highways). Accordingly, when a driver is not in a hurry, he or she may wish to avoid unappealing or boring routes in favor of more scenic or more interesting routes.

The present application provides systems and methods for generating scenic routes. When a driver indicates that he or she wishes to take a scenic route from an origin location to a destination location, a mobile device application may generate a scenic route by selecting route segments between the origin location and the destination location associated with a large number of scenic locations, or associated with particularly popular scenic locations, and may display navigation directions for the generated scenic route.

For example, in one embodiment, a scenic location may be identified based at least in part upon telemetry data from a plurality of drivers. For instance, if telemetry data indicates that a large number of drivers stop briefly at a location not known to be near a POI, that location may be a scenic location (e.g., a location where drivers frequently leave their vehicles to take photos). In some examples, when the mobile device application determines that a user has stopped at a scenic location, the user may be prompted to rate the scenic location, identify the scenic location, or confirm that he or she was stopping to take a photo. In another embodiment, a scenic location may be identified based at least in part upon a number of photos geotagged with the coordinates of the location that are taken, or that are uploaded to social media sites by social media connections of the driver (or by users determined to be similar to the driver). For instance, a location that has been photographed more frequently or whose photographs are more frequently "liked" or "favorited" (especially by social media connections of the driver or by users determined to be similar to the driver) may be considered a more scenic location.

Moreover, the mobile device application may generate an indication of a safe parking location near a scenic location along the scenic route. For instance, a mobile device application may analyze a plurality of parking locations near scenic locations along the scenic route to determine a safe parking location, e.g., a parking location associated with a lower risk of damage to the vehicle. The navigation directions for the generated scenic route from the origin location to the destination may include navigation directions to the safe parking locations near various scenic locations.

Figure 1:
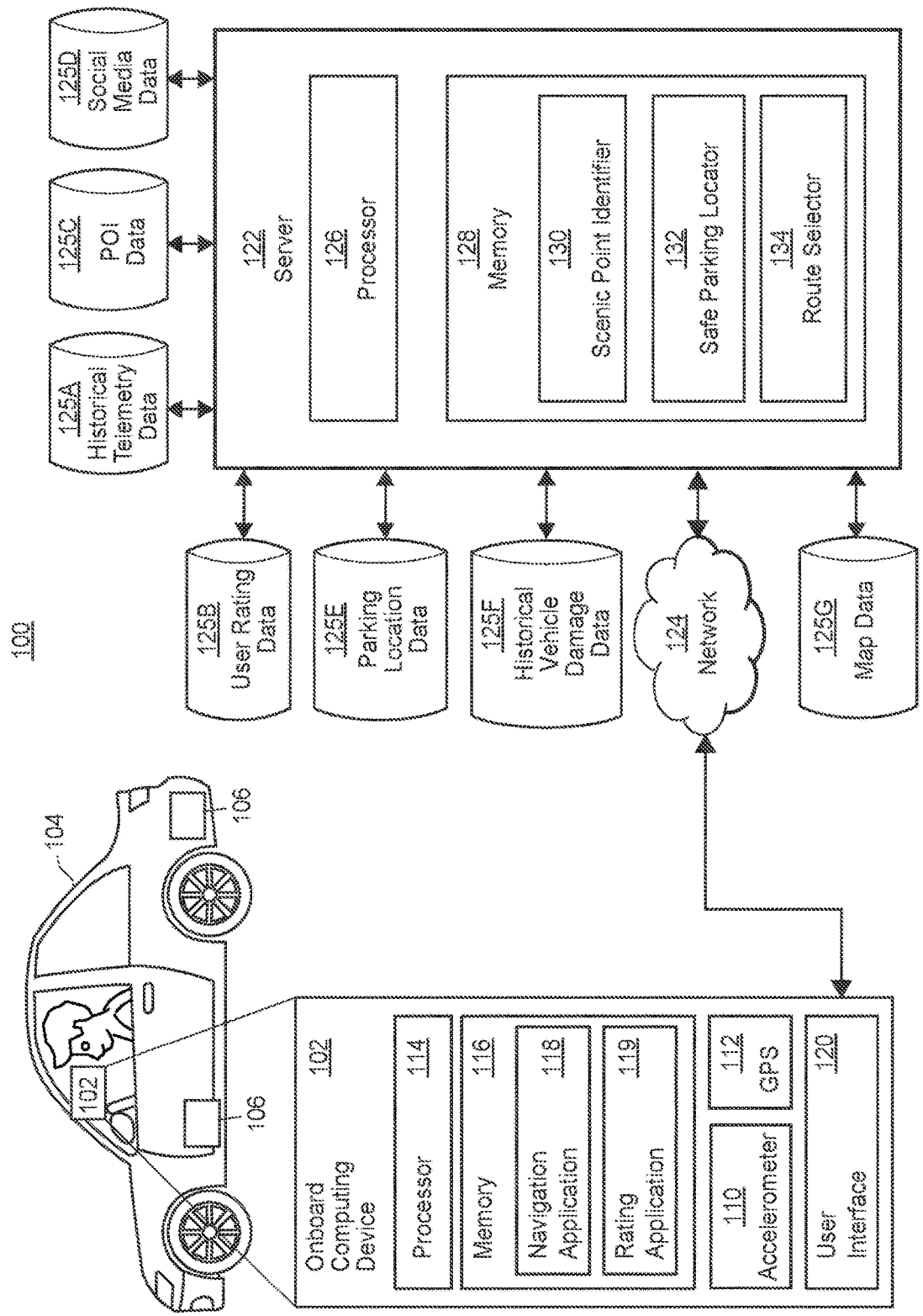
FIG. 1 illustrates a block diagram of an exemplary system for generating scenic routes, in accordance with some embodiments.

Referring now to the drawings, FIG. 1 illustrates a block diagram of an exemplary system 100 for generating scenic routes, in accordance with some embodiments. The high-level architecture illustrated in FIG. 1 may include both hardware and software applications, as well as various data communications channels for communicating data between the various hardware and software components, as is described below. The system 100 may include one or more onboard computing devices 102, which may each be positioned within or otherwise associated with a respective vehicle 104 (which may be, e.g., a car, a truck, a boat, a motorcycle, a motorized scooter, or any other vehicle). For instance, an onboard computing device 102 may be built into the vehicle 104, or may be a mobile device (e.g., a smart phone, a smart watch, a GPS system, etc.) associated with a driver or operator of the vehicle 104.

Each onboard computing device 102 may communicate with various sensors to receive sensor data captured as the respective vehicles 104 travel along various routes. For instance, an onboard computing device 102 may receive sensor data captured by onboard sensors 106 associated with the vehicle, which may include, e.g., location sensors, motion sensors such as accelerometers or gyroscopes, etc. In some examples, in addition to or as an alternative to onboard sensors 106, the onboard computing devices 102 may include internal sensors. For instance, an onboard computing device 102 may include motion sensors 110, such as accelerometers and/or gyroscopes, and/or location sensors 112 such as global positioning sensors configured to capture location data.

Furthermore, each onboard computing device 102 may include one or more processors 114, such as one or more microprocessors, controllers, and/or any other suitable type of processors, and a memory 116 (e.g., volatile memory, non-volatile memory) accessible by the respective one or more processors 114, (e.g., via a memory controller). The one or more processors 114 may interact with the memory 116 to obtain, for example, computer-readable instructions stored on the memory 116. In particular, the computer-readable instructions stored on the memory 116 may include instructions for executing a navigation application 118 configured to generate and display navigation directions for a scenic route for a user of the onboard computing device 102. The computer-readable instructions stored on the memory 116 may further include instructions for executing a rating application 119 configured to prompt users to identify and/or rate scenic points that they visit (and/or parking locations associated therewith), and configured to receive indications of user identifications and/or ratings of the scenic points and/or parking locations. Moreover, the computer-readable instructions stored on the memory 116 may include instructions for carrying out one or more of the steps of the method 300 described in greater detail below with respect to FIG. 3.

Furthermore, each onboard computing device 102 may include a user interface 120, which may be configured to receive input from users (e.g., requests for navigation directions, indications of preferences for scenic routes, indications of user ratings of scenic routes, indications of user ratings and/or identifications of scenic points, indications of user ratings and/or identifications of parking locations, etc.) and/or to display information to users (e.g., navigation directions for scenic routes provided by the navigation application 118, including navigation directions to safe parking locations associated with scenic routes; prompts to rate and/or identify scenic points or parking locations provided by the rating application 119).

Each onboard computing device 102 may be configured to communicate with a server 122, e.g., via a network 124 (e.g., a wireless network). For instance, each onboard computing device 102 may communicate data captured by sensors such as the onboard sensors 106, motion sensors 110, and/or location sensors 112, etc., to the server 122. In some examples, the server 122 may be configured to store the sensor data from each of the onboard computing devices 102 associated with various respective vehicles 104 in a historical telemetry database 125A. Furthermore, each onboard computing device 102 may communicate user input received via the user interface 120, such as requests for navigation directions, indications of preferences for scenic routes, indications of user ratings of scenic routes, indications of user ratings and/or identifications of scenic points, indication of user ratings and/or identifications of parking locations, etc., to the server 122. In some examples, the server 122 may be configured to store the indications of user ratings and/or identifications of scenic points and/or parking locations in a user rating database 125B.

The server 122 may include one or more processors 126, such as one or more microprocessors, controllers, and/or any other suitable type of processors, and a memory 128 (e.g., volatile memory, non-volatile memory) accessible by the respective one or more processors 126, (e.g., via a memory controller). The one or more processors 126 may interact with the memory 128 to obtain, for example, computer-readable instructions stored in the memory 128. In particular, the computer-readable instructions stored on the memory 126 may include instructions for executing various applications, such as, e.g., a scenic point identifier 130, a safe parking locator 132, a route selector 134, etc.

As the processors 126 execute the applications, the server 122 may access various databases 125A-G, which may be internal or external to the server 122, such as the historical telemetry database 125A configured to store historical sensor data captured by the onboard computing devices 102 (and/or from other sources); the user rating database 125B configured to store user ratings associated with scenic routes, scenic points, and/or parking locations visited by various users, as well as identifications of scenic points and/or parking locations visited by various users; a points of interest (POI) database 125C configured to store information related to POIs, including locations of each POI and categories associated with each POI (e.g., categorizing each POI based at least in part upon whether the POI is a restaurant, business, stadium, historical site, park, etc.); a social media database 125D configured to store social media information, including indications of social media posts (including photos) tagged with various locations and indications of user interactions associated with these social media posts; a parking location database 125E configured to store indications of various parking locations; a historical vehicle damage database 125F configured to store information about historical instances of vehicle damage, including locations, dates, and severity associated with each instance; and/or a map database 125G storing map data indicating various routes and/or route segments as well as locations associated with various addresses, etc. In some embodiments, the server 122 may access additional or alternative databases.

The scenic point identifier 130 may be configured to identify scenic points along various route segments. The scenic point identifier 130 may analyze historical location data and/or motion data associated with vehicles 104 stored in the historical telemetry database 125A to identify historical "stopping points": locations in which a number of vehicles 104 (e.g., a number above a threshold number) have historically stopped for greater than a threshold period of time (e.g., greater than one minute, greater than five minutes, greater than ten minutes) or for a period of time within a certain range of time periods (e.g., between one and five minutes, between five and ten minutes, etc.) The scenic point identifier 130 may cross-reference the identified stopping points against POI locations stored in the POI database 125C in order to identify "scenic points": historical stopping points that are greater than a threshold distance (e.g., greater than half a mile, greater than one mile, greater than two miles, etc.) from any POIs. In particular, scenic points may be locations where many historical drivers have stopped to look at a scenic view rather than to visit a POI.

In some examples, the scenic point identifier 130 may factor additional information into the determination of scenic points. For instance, in some examples, the scenic point identifier 130 may access a social media database 125D and may identify certain historical stopping points as scenic points based at least partly upon whether the stopping points are associated with locations tagged in a large number of social media posts, or tagged in popular social media posts, or tagged in social media posts associated with social media connections of the user.

Furthermore, while generally speaking the scenic point identifier 130 identifies scenic points based at least in part upon stopping points that are a certain distance away from POIs, in some instances, the scenic point identifier 130 may identify certain historical stopping points as scenic points based at least partly upon whether the stopping points are closer to certain types of POIs. For instance, certain types of POIs may be considered scenic POIs, and scenic points may be stopping points closer to these scenic POIs (e.g., within a certain threshold distance) but further from other types of POIs (e.g., further than a threshold distance away from the other types of POIs). For instance, the scenic point identifier 130 may identify stopping points near POIs such as national or state parks, or POIs associated with lakes, rivers, or other bodies of water, but further from POIs associated with businesses and restaurants, as scenic points in some examples.

Moreover, in some examples, the scenic point identifier 130 may obtain user rating data from a user rating database 125B and may identify certain historical stopping points as scenic points based at least partly upon user ratings associated with historical stopping points. For instance, a user who stops at a location greater than a threshold distance from any POIs may be prompted (e.g., via the user interface 120 of his or her onboard computing device 102) to indicate whether he or she stopped to view the scenery, and/or may be asked to rate the scenic point (e.g., a numerical rating, an alphabetical rating, a start rating, etc.), and these ratings may be provided to the server 122, e.g., via the network 124. Accordingly, in some examples, the scenic point identifier 130 may identify stopping points associated with a large number of indications that users have stopped to view scenery and/or stopping points associated with high user ratings (e.g., ratings above a threshold level) as scenic points.

The safe parking locator 132 may be configured to identify safe parking locations near scenic points along various route segments. The safe parking locator 132 may obtain parking location data stored in a parking location database 125E, which may include locations of paid or public parking lots or individual parking spots. The safe parking locator 132 may additionally obtain parking location data stored in the user rating database 125B, such as, e.g., user ratings associated with parking locations, and/or user identifications of ad-hoc parking spots in rural or natural environments where users have historically stopped in order to view scenic points. Furthermore, the safe parking locator 132 may obtain historical vehicle damage data from a historical vehicle damage database 125F. The historical vehicle damage data may include indications of locations, dates, and severity associated with various historical instances in which vehicles were damaged. For instance, in some examples, the historical vehicle damage database 125F may be an insurance database. The safe parking locator 132 may cross reference parking locations with the indications of locations, dates, and severity associated with the historical vehicle damage to identify which parking locations are more safe and which parking locations are less safe. In some instances, this may include assigning a safe parking score to each parking location. Furthermore, the safe parking locator 132 may identify the safest parking location within a certain threshold distance of each scenic point and/or the closest parking location to each scenic point that exceeds a certain safe parking score threshold.

The route selector 134 may generate routes based at least in part upon user requests for navigation directions received by the server 122 from onboard computing devices 102. A particular user request for navigation directions may include an indication of an origin location and a destination location, as well as an indication of whether a user has indicated a preference for a scenic route. The route selector 134 may identify a plurality of routes between the origin location and the destination location using map data from the map database 125G. If there is no indication that a user has indicated a preference for a scenic route, the route selector 134 may select a route based at least in part upon factors such as which route is associated with the shortest driving distance, which route is associated with the shortest driving time, etc. However, if there is an indication that the user has indicated a preference for a scenic route, the route selector 134 may select a route based at least in part upon the scenic points along each of the route segments of each of the identified plurality of routes. For example, if there is an indication that the user has indicated a preference for a scenic route, the route selector 134 may select a route whose route segments are associated with a greater number of scenic points rather than a route associated with the shortest driving distance or the shortest driving time. The route selector 134 may communicate an indication of the selected one route to an onboard computing device 102 associated with the user who made the request for navigation directions, and the navigation application 118 of the onboard computing device 102 may cause the route to be displayed via the user interface 120 of the onboard computing device 102.

Moreover, the computer-readable instructions stored on the memory 128 may include instructions for carrying out any of the steps of the method 300 described in greater detail below with respect to FIG. 3. Furthermore, in some examples, steps described above as being performed by the processor 126 of the server 122 may be performed by the processor 114 of the onboard computing device 102, or vice versa.

Figure 2A:
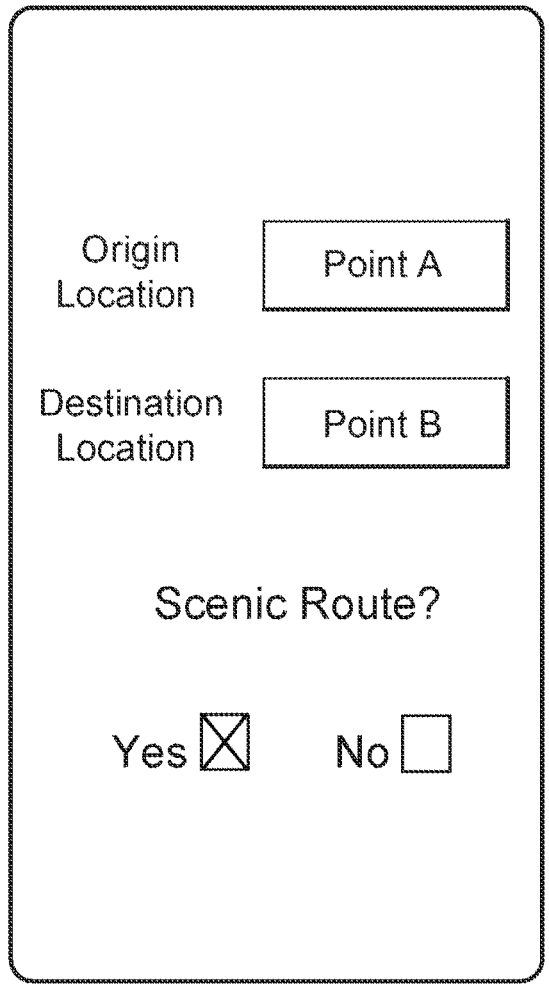
FIG. 2A illustrates an exemplary user interface display, in accordance with some embodiments.
Figure 2B:
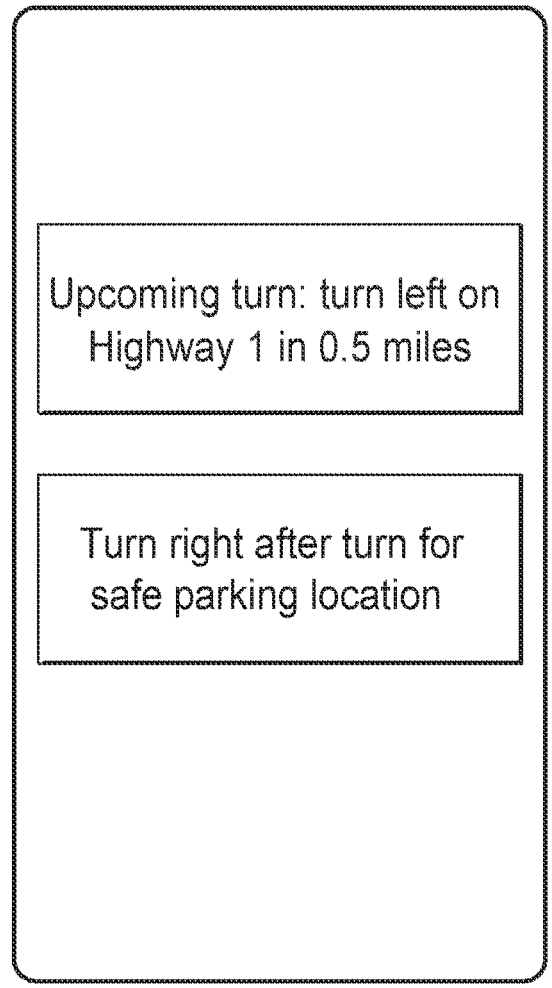
FIG. 2B illustrates an exemplary user interface display, in accordance with some embodiments.

FIG. 2A and FIG. 2B illustrate exemplary user interface displays, in accordance with some embodiments. For instance, as shown in FIG. 2A, a user may provide input related to a request for navigation directions via a user interface (e.g., user interface 120 as shown in FIG. 1), including an indication of an origin location, a destination location, and an indication of whether or not the user has a preference for a scenic route. In some examples (not shown), a user may further indicate which types of landscapes he or she finds scenic (e.g., mountains, oceans, lakes, rivers, forests, interesting architecture or historical buildings, etc.) As shown in FIG. 2B, the user interface display may show notifications indicating upcoming maneuvers (e.g., "turn left on Highway 1 in 0.5 miles") of a selected scenic route and/or for safe parking locations associated with scenic points of the selected scenic route. In other examples (not shown), the user interface display may include a graphic display of the route and associated maneuvers, e.g., in the context of a map.

Figure 3:
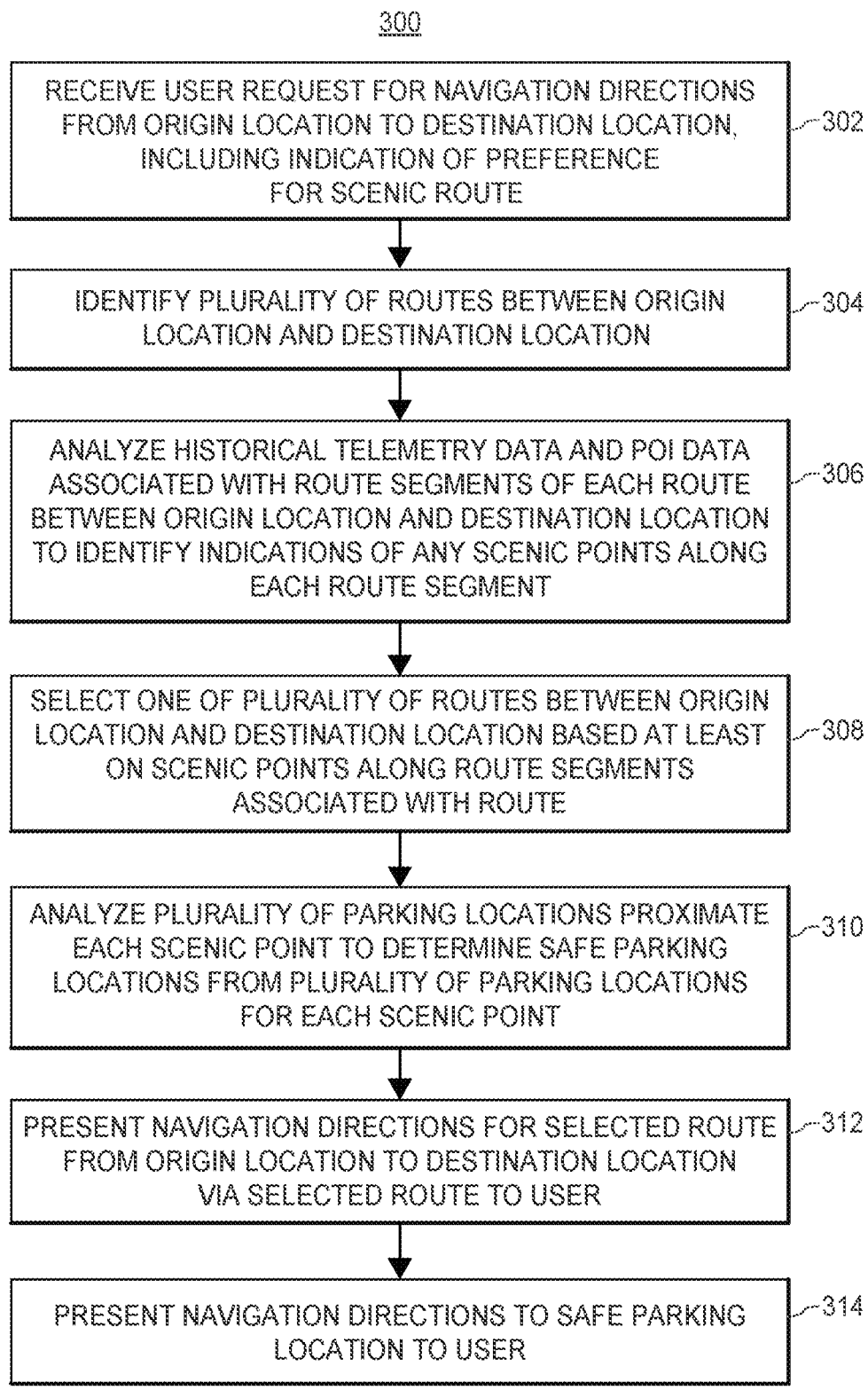
FIG. 3 illustrates a flow diagram of an exemplary method for generating scenic routes, in accordance with some embodiments.

Referring now to FIG. 3, a flow diagram of an exemplary method 300 for generating scenic routes is illustrated, in accordance with some embodiments. One or more steps of the method 300 may be implemented as a set of instructions stored on a computer-readable memory and executable on one or more processors.

The method 300 may begin when a user request for navigation directions from an origin location to a destination location is received (block 302). In particular, a user request may include an indication of a user preference for a scenic route. For example, a user may indicate his or her preference for a scenic route using via a user interface of a mobile computing device. In some examples, the user may indicate his or her preference for a scenic route when requesting the navigation directions, while in other examples, the user may indicate a general preference for scenic routes for all requests for navigation directions. For instance, some users may only prefer more scenic routes when they are not rushed, while other users may prefer more scenic routes generally, e.g., during all or most trips. In some examples, a user may further indicate which types of landscapes he or she finds scenic (e.g., mountains, oceans, lakes, rivers, forests, interesting architecture or historical buildings, etc.)

A plurality of routes between the origin location and the destination location may be identified (block 304) based at least in part upon map data. Each route may include one or more maneuvers (e.g., turns, stops, etc.) as well as a number of route segments, e.g., portions of the route between each maneuver. For example, a first route between an origin ("Point A") and a destination ("Point B") may be to turn left from Point A onto Highway 1, drive for 2 miles, turn right on Road 2, drive for 1 mile, and then turn left on Street 3 and drive for 0.5 miles to reach Point B. The 2 miles on Highway 1, the 1 mile on Road 2, and the 0.5 miles on Street 3 may each be route segments of the first route. A second route between Point A and Point B may be to drive straight on Parkway 4 for 1 mile, then turn left on Street 3 and drive for 2.5 miles to reach point B. The 1 mile on Parkway 4, and the 2.5 miles on Street 3 may each be route segments of the second route.

Historical telemetry data and POI data associated with one or more route segments associated with each route of the plurality of routes between the origin location and the destination location may be analyzed (block 306) to identify one or more scenic indications associated with one or more scenic points along each route segment of the one or more route segments. The historical telemetry data may include one or more stopping indications corresponding to one or more locations along each route segment of the one or more route segments where one or more vehicles has historically stopped for a time period greater than a predetermined threshold time period (e.g., above one minute, above five minutes, above fifteen minutes, etc.), or where one or more vehicles has historically stopped for time periods within a certain range of time periods (e.g., between one minute and five minutes, between two minutes and ten minutes, between ten minutes and fifteen minutes, etc.). The POI data may include one or more POI indications corresponding to one or more points of interest along each route segment of the one or more route segments. For instance, POIs may include restaurants and bars, hotels, gyms, stores, other businesses, historical sites, museums, other tourist attractions, parks, etc. Generally speaking, scenic points may include stopping points that are greater than a threshold distance (e.g., 0.5 miles, 1 mile, 5 miles, etc.) from any POI. That is, a scenic point may be a location where a driver stops to enjoy the scenery rather than to visit a POI. However, in some examples, certain POIs may be considered scenic POIs, and may be associated with scenic points. For instance, POIs such as national or state parks, or POIs associated with lakes, rivers, or other bodies of water may be considered scenic points in some examples.

Moreover, in some examples, scenic points may be identified based at least in part upon locations tagged in social media posts. For example, a location tagged in a large number of photos posted to social media (e.g., a number of photos above a threshold number) may be a scenic point. Similarly, a location tagged in a photo associated with a high level of user interaction (e.g., a level of user interaction that exceeds a threshold level) may be considered a scenic point. For instance, a location tagged in a social media post that a large number of social media users (e.g., a number of social media users above a threshold number) have "liked," or "favorited," and/or a social media post associated with a large number of comments (e.g., a number of comments above a threshold number) may be considered a scenic point. Furthermore, in some examples, scenic points may be user-specific. For instance, locations tagged in social media posts posted by social media connections of the user or locations tagged in social media posts associated with a high level of user interaction (e.g., a level of user interaction that exceeds a threshold level) from social media connections of the user may be considered user-specific scenic points.

Additionally, in some examples, scenic points may be identified based at least in part upon ratings from other users. For instance, when a user stops at a location greater than a threshold distance from any POIs, the user may be prompted to indicate whether he or she stopped to view the scenery, and/or may be asked to rate the scenic point (e.g., a numerical rating, an alphabetical rating, a start rating, etc.). Accordingly, in some examples, stopping points associated with a large number of indications that users have stopped to view scenery and/or stopping points associated with high ratings (e.g., ratings above a threshold level) from other users may be considered scenic points. Furthermore, in some examples, rating the scenic point may include providing an indication of the type of scenery viewable at the scenic point (e.g., mountains, oceans, lakes, rivers, forests, interesting architecture or historical buildings, etc.)

One of the plurality of routes between the origin location and the destination location may be selected (block 308) based at least in part upon the scenic points associated with the route segments of the route. For instance, in some examples, a route may be selected based at least in part upon a number of scenic points (e.g., a number of scenic points above a threshold number) associated with the route. As another example, a route may be selected based at least in part upon ratings associated with scenic points associated with the route. Moreover, a route may be selected at least partly based at least in part upon a comparison of a user's indication of which types of scenery he or she finds scenic and which types of scenery users have indicated is viewable at each scenic point along the route.

A plurality of parking locations proximate scenic points may be analyzed (block 310) to determine a safe parking location from the plurality of parking locations for each of the scenic points. For instance, parking locations associated with a lower risk of damage to a vehicle may be considered safer parking locations. Some scenic points may be easily accessible from safe parking locations, while for some scenic points, a safe parking location may be further away or in an unexpected location for a new visitor. For instance, if the scenic point is an overlook from a mountain, there may be an unsafe parking location that is easily visible from the overlook (e.g., susceptible to falling rocks), but there may be a much safer parking location that is not easily visible to a driver driving uphill.

Insurance data indicative of historical instances of vehicle damage and locations associated therewith may be analyzed to assign a safe parking score or rating to individual parking locations and/or to various route segments. For instance, parking locations and/or route segments associated with a greater number of historical instances of vehicle damage, and/or more frequent historical instances of vehicle damage, and/or more severe historical instances of vehicle damage may be assigned lower safe parking scores, while parking locations and/or route segments associated with a lower number of historical instances of vehicle damage, and/or less frequent historical instances of vehicle damage, and/or less severe historical instances of vehicle damage may be assigned higher safe parking scores. In some examples, users who park at a particular parking location may be prompted to rate the safety of the parking location, and the safe parking score may be calculated in part based at least in part upon the user rating.

Accordingly, determining a safe parking location for a scenic point may include selecting the parking location with the highest safe parking score within a certain threshold distance of the location of the scenic point. As another example, determining a safe parking location for a scenic point may include selecting the closest parking location to the scenic point associated with a parking score above a certain threshold value.

Navigation directions for the selected one route from the origin location to the destination location may be presented (block 312) to the user e.g., via a user interface. For example, the route may be provided as a map, as a list of maneuvers, etc. In some examples, providing the selected one route may include providing an indication of which scenic points are located along the selected one route. In some instances, a user may select which scenic points he or she intends to visit as he or she travels along the route.

Navigation directions to the safe parking locations proximate the scenic points maybe presented (block 314) to the user, e.g., via a user interface. For example, the route may be provided as a map, as a list of maneuvers, etc. In some examples, the navigation directions to safe parking locations proximate the scenic points may be shown as a smaller map inset inside a larger map showing the route from the origin location to the destination location. Moreover, in some examples, the navigation directions to safe parking locations proximate a particular scenic point may be provided in response to receiving an indication that a user intends to visit the scenic point.

Additionally, in some examples, the method may include prompting a user who stops at a previously-identified scenic point to rate the scenic point, which may include providing an indication of the type of scenery viewable from the scenic point. Similarly, in some examples, the method may include prompting a user who stops at a parking location to rate the safety of the parking location.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based at least in part upon data that reflects low risk behavior and/or technology that mitigates or prevents risk to (i) insured assets, such as homes, personal belongings, or vehicles, and/or (ii) home or apartment occupants.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as examples and does not describe every possible embodiment, as describing every possible embodiment would be impractical, if not impossible. One could implement numerous alternate embodiments, using either current technology or technology developed after the filing date of this application.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method comprising:
receiving, by one or more processors, a user request from a user for directions from an origin location to a destination location;
identifying, by the one or more processors, one or more route segments of one or more routes between the origin location and the destination location based on at least telemetry data and point of interest (POI) data to identify one or more respective scenic points along each route segment of the one or more route segments, wherein the one or more respective scenic points are identified based on one or more stopping points along the one or more route segments that are greater than a threshold distance from one or more POIs;
determining, by the one or more processors, one or more respective scenic views proximate to the one or more respective scenic points along each route segment of the one or more route segments of the one or more routes, wherein the one or more respective scenic views are determined based on social media posts that exceed at least one of a threshold number of tags or a threshold number of interactions;
transmitting to the user a selectable option for viewing a route of the one or more routes that includes least one of the one or more respective scenic views;
receiving, by the one or more processors, a selection of the user to view the route that includes that at least one of the one or more respective scenic views; and
transmitting, by the one or more processors, navigation directions to the user for the route from the origin location to the destination location comprising the at least one of the one or more respective scenic views, as selected.

2. The computer-implemented method of claim 1, wherein the threshold distance is approximately a half mile.

3. The computer-implemented method of claim 1, wherein the one or more respective scenic views are based at least on one or more types of the one or more respective scenic views that match a user preference of the user.

4. The computer-implemented method of claim 1 further comprising:
receiving, by the one or more processors, a selection of one or more of the one or more respective scenic points located along the route, wherein the at least one of the one or more respective scenic views is proximate to the one or more of the one or more respective scenic points.

5. The computer-implemented method of claim 1 further comprising:
assigning a respective safe parking score to each parking location proximate to the one or more respective scenic points based on at least identifying a safest respective parking location within a threshold distance of each of the one or more respective scenic points; and
identifying a closest respective parking location to each scenic point of the one or more respective scenic points that has a respective safe parking score matching or exceeding a threshold safe parking score.

6. The computer-implemented method of claim 1 wherein:
determining the one or more respective scenic views further comprises:
determining the one or more respective scenic views based at least on social media posts that exceed the threshold number of interactions.

7. The computer-implemented method of claim 1, wherein transmitting the navigation directions further comprises:
transmitting, by the one or more processors to a user interface of a computing device of the user, a digital map comprising driving instructions directing the user to one or more safe parking locations proximate to the one or more respective scenic points, wherein the user interface comprises a smaller map inset inside a larger map of the origin location to the destination location.

8. A system comprising one or more processors and one or more non- transitory computer-readable media storing computing instructions that, when executed on the one or more processors, cause the one or more processors to perform operations comprising:
receiving, by one or more processors, a user request from a user for directions from an origin location to a destination location;
identifying, by the one or more processors, one or more route segments of one or more routes between the origin location and the destination location based on at least telemetry data and point of interest (POI) data to identify one or more respective scenic points along each route segment of the one or more route segments, wherein the one or more respective scenic points are identified based on one or more stopping points along the one or more route segments that are greater than a threshold distance from one or more POIs;
determining, by the one or more processors, one or more respective scenic views proximate to the one or more respective scenic points along each route segment of the one or more route segments of the one or more routes, wherein the one or more respective scenic views are determined based on social media posts that exceed at least one of a threshold number of tags or a threshold number of interactions;
transmitting to the user a selectable option for viewing a route of the one or more routes that includes least one of the one or more respective scenic views;
receiving, by the one or more processors, a selection of the user to view the route that includes that at least one of the one or more respective scenic views; and
transmitting, by the one or more processors, navigation directions to the user for the route from the origin location to the destination location comprising the at least one of the one or more respective scenic views, as selected.

9. The system of claim 8, wherein the threshold distance is approximately a half mile.

10. The system of claim 8, wherein the one or more respective scenic views are based at least on one or more types of the one or more respective scenic views that match a user preference of the user.

11. The system of claim 8, wherein the operations further comprise:
receiving, by the one or more processors, a selection of one or more of the one or more respective scenic points located along the route, wherein the at least one of the one or more respective scenic views is proximate to the one or more of the one or more respective scenic points.

12. The system of claim 8, wherein the operations further comprise:
assigning a respective safe parking score to each parking location proximate to the one or more respective scenic points based on at least identifying a safest respective parking location within a threshold distance of each of the one or more respective scenic points; and
identifying a closest respective parking location to each scenic point of the one or more respective scenic points that has a respective safe parking score matching or exceeding a threshold safe parking score.

13. The system of claim 8, wherein:
determining the one or more respective scenic views further comprises:
determining the one or more respective scenic views based at least on social media posts that exceed the threshold number of interactions.

14. The system of claim 8, wherein transmitting the navigation directions further comprises:
transmitting, by the one or more processors to a user interface of a computing device of the user, a digital map comprising driving instructions directing the user to one or more safe parking locations proximate to the one or more respective scenic points, wherein the user interface comprises a smaller map inset inside a larger map of the origin location to the destination location.

15. One or more non-transitory computer-readable media storing computing instructions that, when executed by one or more processors, cause the one or more processors to perform operations comprising:
receiving, by one or more processors, a user request from a user for directions from an origin location to a destination location;
identifying, by the one or more processors, one or more route segments of one or more routes between the origin location and the destination location based on at least telemetry data and point of interest (POI) data to identify one or more respective scenic points along each route segment of the one or more route segments, wherein the one or more respective scenic points are identified based on one or more stopping points along the one or more route segments that are greater than a threshold distance from one or more POIs;
determining, by the one or more processors, one or more respective scenic views proximate to the one or more respective scenic points along each route segment of the one or more route segments of the one or more routes, wherein the one or more respective scenic views are determined based on social media posts that exceed at least one of a threshold number of tags or a threshold number of interactions;
transmitting to the user a selectable option for viewing a route of the one or more routes that includes least one of the one or more respective scenic views;
receiving, by the one or more processors, a selection of the user to view the route that includes that at least one of the one or more respective scenic views; and
transmitting, by the one or more processors, navigation directions to the user for the route from the origin location to the destination location comprising the at least one of the one or more respective scenic views, as selected.

16. The one or more non-transitory computer-readable media of claim 15, wherein the threshold distance is approximately a half mile, and wherein the one or more respective scenic views are based at least on one or more types of the one or more respective scenic views that match a user preference of the user.

17. The one or more non-transitory computer-readable media of claim 15, wherein the operations further comprise:
receiving, by the one or more processors, a selection of one or more of the one or more respective scenic points located along the at least one route, wherein the at least one of the one or more respective scenic views is proximate to the one or more of the one or more respective scenic points.

18. The one or more non-transitory computer-readable media of claim 15, wherein the operations further comprise:
assigning a respective safe parking score to each parking location proximate to the one or more respective scenic points based on at least identifying a safest respective parking location within a threshold distance of each of the one or more respective scenic points; and
identifying a closest respective parking location to each scenic point of the one or more respective scenic points that has a respective safe parking score matching or exceeding a threshold safe parking score.

19. The one or more non-transitory computer-readable media of claim 15, wherein the operations further comprise:
determining the one or more respective scenic views further comprises:
determining the one or more respective scenic views based at least on social media posts that exceed the threshold number of interactions.

20. The one or more non-transitory computer-readable media of claim 15, wherein transmitting the navigation directions further comprises:
transmitting, by the one or more processors to a user interface of a computing device of the user, a digital map comprising driving instructions directing the user to one or more safe parking locations proximate to the one or more respective scenic points, wherein the user interface comprises a smaller map inset inside a larger map of the origin location to the destination location.

\* \* \* \* \*